United States Patent
Manolakos et al.

(10) Patent No.: US 11,641,636 B2
(45) Date of Patent: *May 2, 2023

(54) CONFIGURABLE QUALITY METRIC FOR POSITIONING MEASUREMENTS

(71) Applicant: QUALCOMM Incorporated, San Diego, CA (US)

(72) Inventors: Alexandros Manolakos, Escondido, CA (US); Guttorm Ringstad Opshaug, Redwood City, CA (US); Sony Akkarakaran, Poway, CA (US); Arash Mirbagheri, San Diego, CA (US); Tao Luo, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,533

(22) Filed: Jan. 11, 2022

(65) Prior Publication Data

US 2022/0141793 A1 May 5, 2022

Related U.S. Application Data

(63) Continuation of application No. 16/900,522, filed on Jun. 12, 2020, now Pat. No. 11,240,778.

(30) Foreign Application Priority Data

Aug. 14, 2019 (GR) .............................. 20190100359

(51) Int. Cl.
*H04W 64/00* (2009.01)
*G01S 5/02* (2010.01)
(Continued)

(52) U.S. Cl.
CPC ........... *H04W 64/003* (2013.01); *G01S 5/021* (2013.01); *G01S 5/0236* (2013.01); *H04L 5/005* (2013.01); *H04W 24/10* (2013.01)

(58) Field of Classification Search
CPC ... H04W 64/003; H04W 24/10; H04W 64/00; G01S 5/021; G01S 5/0236; G01S 5/10;
(Continued)

(56) References Cited

U.S. PATENT DOCUMENTS 9,986,373 B2 * 5/2018 Davydov .................. G01S 5/10
2011/0207477 A1 8/2011 Siomina et al.
(Continued)

OTHER PUBLICATIONS

CATT:"Summary of UE and gNB Measurements for NR Positioning",3GPP Draft,R1-1910321,3GPP TSG RAN WG1 #98bis,FL Summary of NR POS Measurement,3rd Gen Partnership Project(3GPP),Mobile Competence Centre, 650. Route Des Lucioles,F-06921 Sophia-Antipolis Cedex.FR,vol. RAN WG1.No. Chongqing,CN,Oct. 14, 2019-Oct. 18, 2019,Oct. 22, 2019(Oct. 22, 2019).XP051798586,pp. 1-33, from Internet:URL:https://ftp.3gpp.org/tsg_ran/WG1_RL1/TSGR1_98b/Docs/R1-1910321.zip R1-1910321 FL Summary of NR POS Measurement.docx [retrieved Oct. 22, 2019] p. 26-p. 27.
(Continued)

*Primary Examiner* — Kabir A Timory
(74) *Attorney, Agent, or Firm* — Muncy, Geissler, Olds & Lowe, P.C.

(57) ABSTRACT

Disclosed are techniques for wireless communication. In an aspect, a network node performs one or more positioning measurements of one or more types of positioning measurements of one or more reference signals, and reports, to a positioning entity, the one or more positioning measurements and one or more measurement quality values representing a measurement quality of the one or more positioning measurements, the one or more measurement quality
(Continued)

values based on measurement quality reporting parameters, wherein the measurement quality reporting parameters comprise a minimum error value, a maximum error value, a number of bits used for the one or more measurement quality values, a scaling function or an identifier of the scaling function, or any combination thereof.

30 Claims, 10 Drawing Sheets

(51) Int. Cl.
　　　*H04L 5/00*　　　(2006.01)
　　　*H04W 24/10*　　　(2009.01)
(58) Field of Classification Search
　　　CPC ............. G01S 5/0036; G01S 2205/008; G01S 5/0244; H04L 5/005; H04L 27/261; H04L 5/001; H04L 5/0023; H04L 5/0048; H04L 25/0224
　　　See application file for complete search history.

(56) References Cited

U.S. PATENT DOCUMENTS

| | | |
|---|---|---|
| 2013/0301451 A1 | 11/2013 | Siomina et al. |
| 2018/0049149 A1 | 2/2018 | Lee et al. |
| 2021/0051623 A1 | 2/2021 | Manolakos et al. |

OTHER PUBLICATIONS

Ericsson: "Clarification on Requirements for New PRS Configurations", 3GPP Draft, R4-1705593 CR 36133, 3GPP TSG-RAN WG4 Meeting #83, Clarification on Requirements for New PRS Configurations, 3rd Generation Partnership Project (3GPP), Mobile Competence Centre, 650, Route Des Lucioles, F-06921 Sophia, vol. RAN WG4, No. Hangzhou, May 15, 2017-May 19, 2017, May 14, 2017 (May 14, 2017), XP051277655, 17 Pages, Retrieved from the Internet: URL: http://www.3gpp.org/ftp/Meetings_3GPP_SYNC/RAN4/Docs/ [retrieved on May 14, 2017] p. 1-p. 17.
Ericsson: On Higher Resolution RSTD Measurement Report Mapping, 3GPP Draft, R2-166676, 3GPP TSG-RAN WG2 #95bis, 3rd Generation Partnership Project (3GPP), Mobile Competence Centre, 650, Route Des Lucioles, F-06921 Sophia-Antipolis Cedex, France, vol. RAN WG2, No. Kaohsiung, Taiwan, Oct. 10, 2016-Oct. 14, 2016, Oct. 9, 2016 (Oct. 9, 2016), XP051151156, pp. 1-5, Retrieved from the Internet: URL: http://www.3gpp.org/ftp/Meetings_3GPP_SYNC/RAN2/Docs/ [retrieved on Oct. 9, 2016] p. 1-p. 5.
Ericsson: "Reverberation Chamber Validation Measurements", 3GPP Draft, R4-1815326, TSG-RAN Working Group 4 (Radio) meeting 89, 3rd Generation Partnership Project (3GPP), Mobile Competence Centre, 650, Route Des Lucioles, F-06921 Sophia-Antipolis Cedex, France, vol. TSG RAN, No. Spokane, U.S, Nov. 12, 2018-Nov. 16, 2018, Nov. 11, 2018 (Nov. 11, 2018), XP051559635, 5 Pages, Retrieved from the Internet: URL: http://www.3gpp.org/ftp/Meetings%5F3GPP%5FSYNC/RAN4/Docs/R4%2D1815326%2Ezip [retrieved on Nov. 11, 2018] p. 1-p. 5.
International Search Report and Written Opinion—PCT/US2020/037822—ISA/EPO—dated Oct. 2, 2020.
Qualcomm Incorporated: "Remaining Details on UE & gNB Measurements for NR Positioning", 3GPP Draft, R1-1912975, 3GPP TSG RAN WG1 #98, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Nov. 9, 2019 (Nov. 9, 2019), XP051823737, pp. 1-12, Retrieved from the Internet: URL: https://ftp.3gpp.org/tsg_ran/WG1_RL1/TSGR1_99/Docs/R1-1912975.zip R1-1912975.docx [retrieved on Nov. 9, 2019] Pg—p. 12.
Rohde & Schwarz:"Corrections to RSTD Reporting Accuracy NB-IOT Tests",3GPP Draft,3GPP TSG-RAN WG5 Mtg #82, 37571-1_CR0279R1_(REL-15)_R5-192851_37.571-1-Correction_NBIOT_RSTD_Accuracy,3rd Gen Partnership Project(3GPP),Mobile Competence Centre, 650,Route Des Lucioles,F-06921 Sophia,vol. RAN WG5,No. Athens,GR,Feb. 25, 2019-Mar. 1, 2019,Mar. 12, 2019(Mar. 12, 2019),XP051685514,47 Pgs, from Internet:URL: http://www.3gpp.org/ftp/3guInternal/3GPP%5FUltimate%5FCRPacks/RP%2D190096%2Ezip [retrieved Mar. 12, 2019] p. 1-p. 43.

\* cited by examiner

CONFIGURABLE QUALITY METRIC FOR POSITIONING MEASUREMENTS

CROSS-REFERENCE TO RELATED APPLICATION

The present Application for Patent is a continuation of U.S. patent application Ser. No. 16/900,522, entitled "CONFIGURABLE QUALITY METRIC FOR POSITIONING MEASUREMENTS," filed Jun. 12, 2020, which claims priority to Greek Patent Application No. 20190100359, entitled "CONFIGURABLE QUALITY METRIC FOR POSITIONING MEASUREMENTS," filed Aug. 14, 2019, each assigned to the assignee hereof, and expressly incorporated herein by reference in its entirety.

BACKGROUND OF THE DISCLOSURE

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, an apparatus for wireless communication includes at least one processor of a network node, and a communication device of the network node coupled to the at least one processor, the at least one processor configured to: perform a positioning measurement of one or more reference signals, and cause the communication device to transmit, to a positioning entity, the positioning measurement and a measurement quality reporting field representing a measurement quality of the positioning measurement, wherein the measurement quality reporting field comprises a minimum error value, a maximum error value, a number of bits, a scaling function or an identifier of the scaling function, or any combination thereof.

In an aspect, an apparatus for wireless communication includes at least one processor of a positioning entity, and a communication device of the positioning entity configured to: transmit, to a network node, positioning assistance data including a measurement quality definition field indicating how a measurement quality of one or more positioning measurements performed by the network node is to be reported, wherein the measurement quality definition field comprises a minimum error value, a maximum error value, a number of bits, a scaling function or an identifier of the scaling function, or any combination thereof, and receive, from the network node, a positioning measurement of one or more reference signals and a measurement quality reporting field indicating a measurement quality of the positioning measurement, wherein the measurement quality reporting field comprises the minimum error value, the maximum error value, the number of bits, the scaling function or the identifier of the scaling function, or any combination thereof.

In an aspect, a method of wireless communication performed by a network node includes performing one or more positioning measurements of one or more types of positioning measurements of one or more reference signals, and transmitting, to the positioning entity, the one or more positioning measurements and one or more measurement quality values representing a measurement quality of the one or more positioning measurements, the one or more measurement quality values based on measurement quality reporting parameters, wherein the measurement quality reporting parameters comprise a minimum error value, a maximum error value, a number of bits used for the one or more measurement quality values, a scaling function or an identifier of the scaling function, or any combination thereof.

In an aspect, a method of wireless communication performed by a positioning entity includes transmitting, to a network node, during a positioning session between a mobile device and the positioning entity, positioning assistance data including a measurement quality definition field indicating how a measurement quality of positioning measurements performed by the network node is to be reported, wherein the measurement quality definition field comprises a minimum error value, a maximum error value, a number of bits used for the measurement quality value, a scaling function or an identifier of the scaling function, or any combination thereof, and receiving, from the network node, one or more positioning measurements of one or more reference signals and one or more measurement quality values representing a measurement quality of the one or more positioning measurements, wherein the one or more measurement quality values are based on the minimum error value, the maximum error value, the number of bits, the scaling function or the identifier of the scaling function, or any combination thereof.

In an aspect, a network node includes means for performing one or more positioning measurements of one or more types of positioning measurements of one or more reference signals, and means for transmitting, to the positioning entity, the one or more positioning measurements and one or more measurement quality values representing a measurement quality of the one or more positioning measurements, the one or more measurement quality values based on measurement quality reporting parameters, wherein the measurement quality reporting parameters comprise a minimum error value, a maximum error value, a number of bits used for the one or more measurement quality values, a scaling function or an identifier of the scaling function, or any combination thereof.

In an aspect, a positioning entity includes means for transmitting, to a network node, during a positioning session between a mobile device and the positioning entity, positioning assistance data including a measurement quality definition field indicating how a measurement quality of positioning measurements performed by the network node is to be reported, wherein the measurement quality definition field comprises a minimum error value, a maximum error value, a number of bits used for the measurement quality value, a scaling function or an identifier of the scaling function, or any combination thereof, and means for receiving, from the network node, one or more positioning measurements of one or more reference signals and one or more measurement quality values representing a measurement quality of the one or more positioning measurements, wherein the one or more measurement quality values are based on the minimum error value, the maximum error value, the number of bits, the scaling function or the identifier of the scaling function, or any combination thereof.

In an aspect, a non-transitory computer-readable medium storing computer-executable instructions includes computer-executable instructions comprising at least one instruction instructing a network node to perform one or more positioning measurements of one or more types of positioning measurements of one or more reference signals, and at least one instruction instructing the network node to transmit, to the positioning entity, the one or more positioning measurements and one or more measurement quality values representing a measurement quality of the one or more positioning measurements, the one or more measurement quality values based on measurement quality reporting parameters, wherein the measurement quality reporting parameters comprise a minimum error value, a maximum error value, a number of bits used for the one or more measurement quality values, a scaling function or an identifier of the scaling function, or any combination thereof.

In an aspect, a non-transitory computer-readable medium storing computer-executable instructions includes computer-executable instructions comprising at least one instruction instructing a positioning entity to transmit, to a network node, during a positioning session between a mobile device and the positioning entity, positioning assistance data including a measurement quality definition field indicating how a measurement quality of positioning measurements performed by the network node is to be reported, wherein the measurement quality definition field comprises a minimum error value, a maximum error value, a number of bits used for the measurement quality value, a scaling function or an identifier of the scaling function, or any combination thereof, and at least one instruction instructing the positioning entity to receive, from the network node, one or more positioning measurements of one or more reference signals and one or more measurement quality values representing a measurement quality of the one or more positioning measurements, wherein the one or more measurement quality values are based on the minimum error value, the maximum error value, the number of bits, the scaling function or the identifier of the scaling function, or any combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
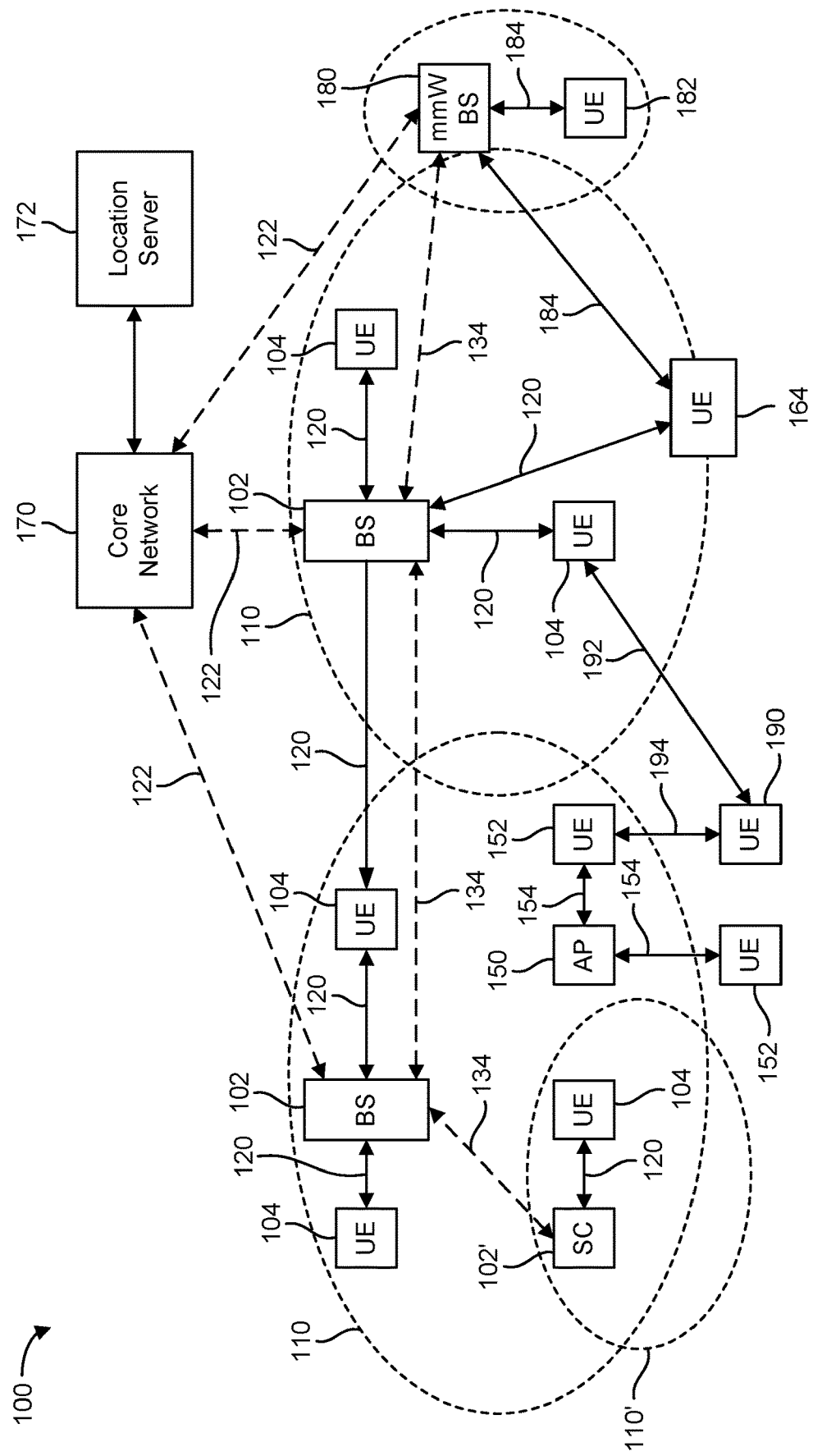
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., SSB) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit one or more reference signals to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
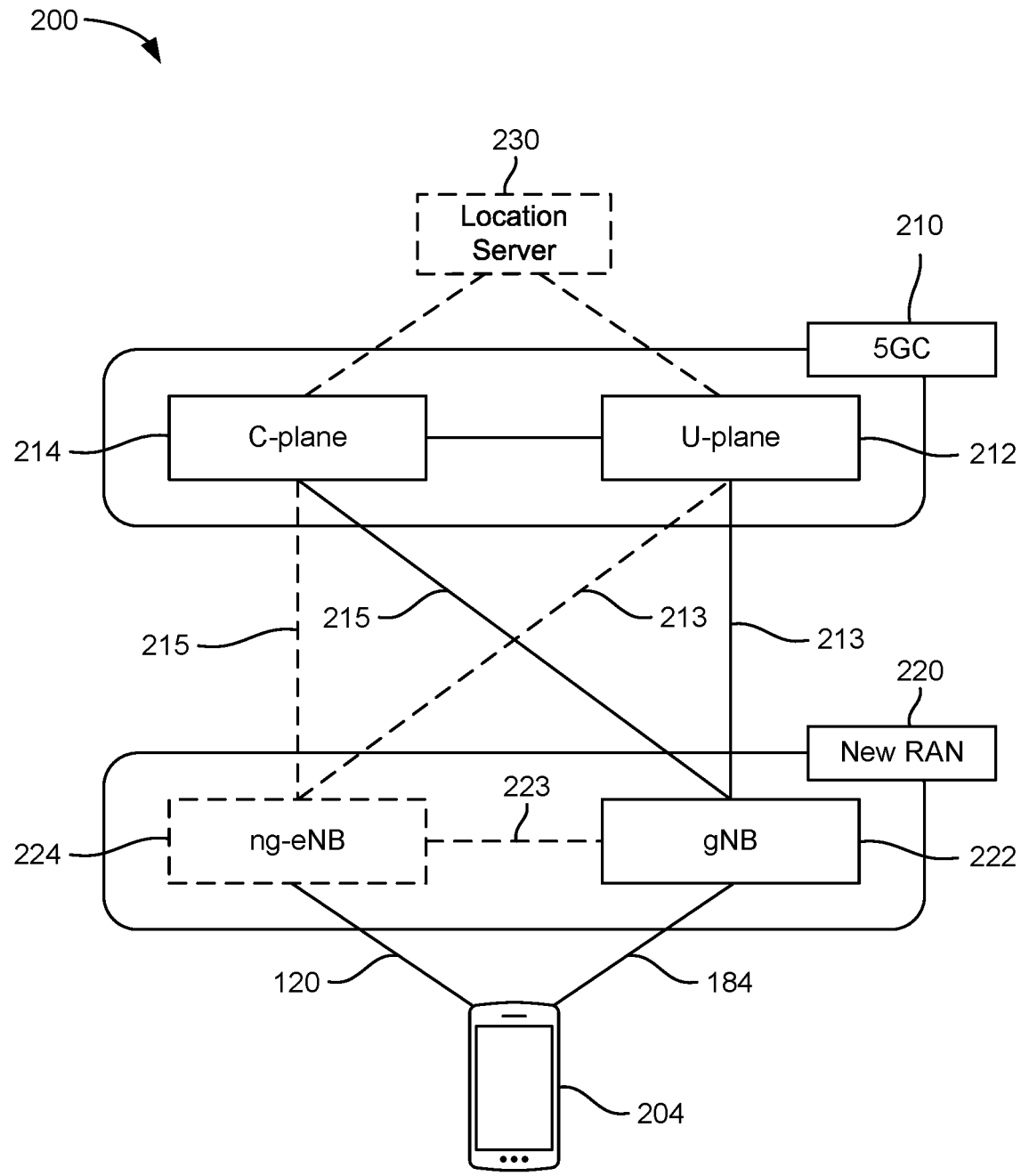
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.)

which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
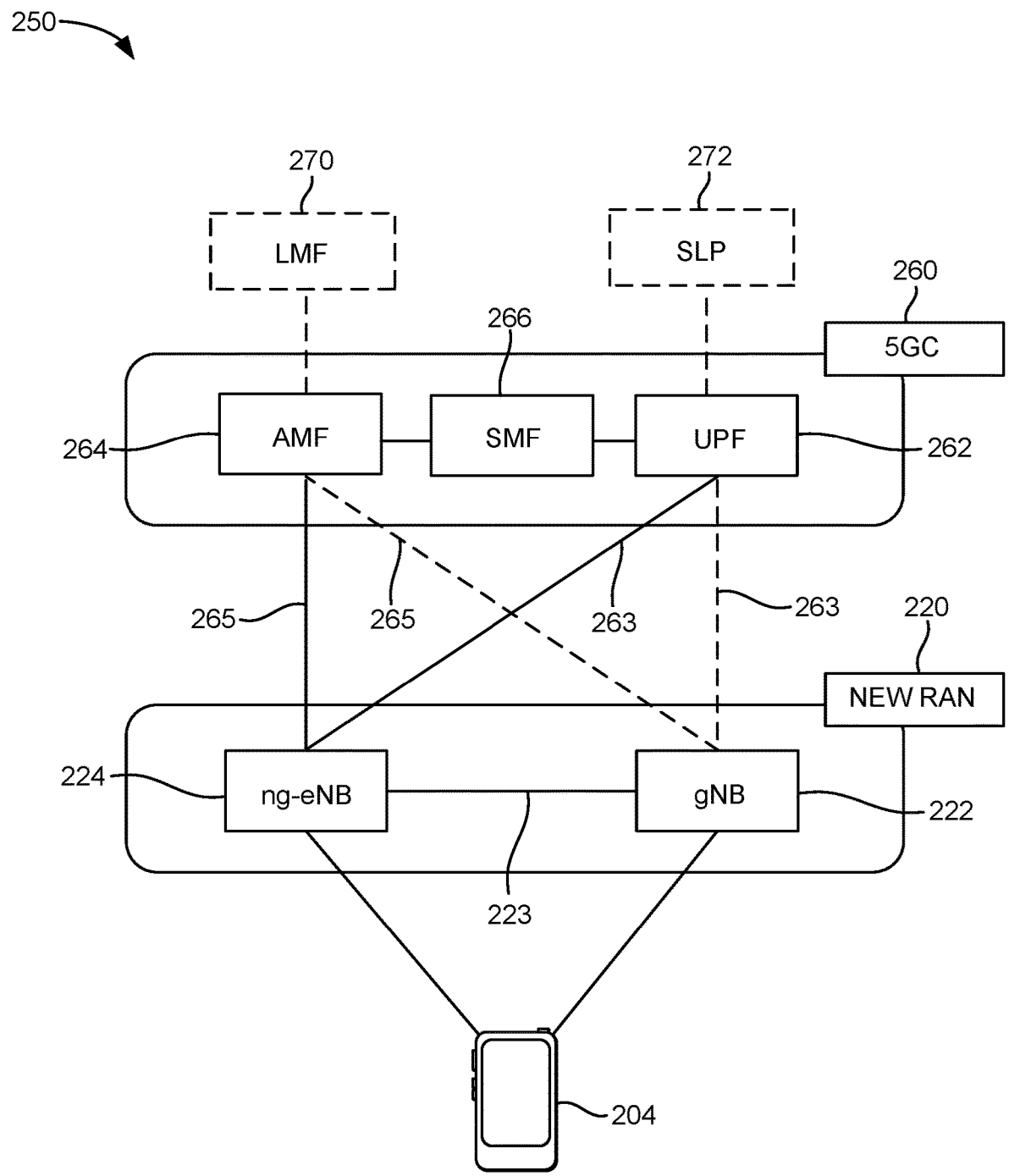

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
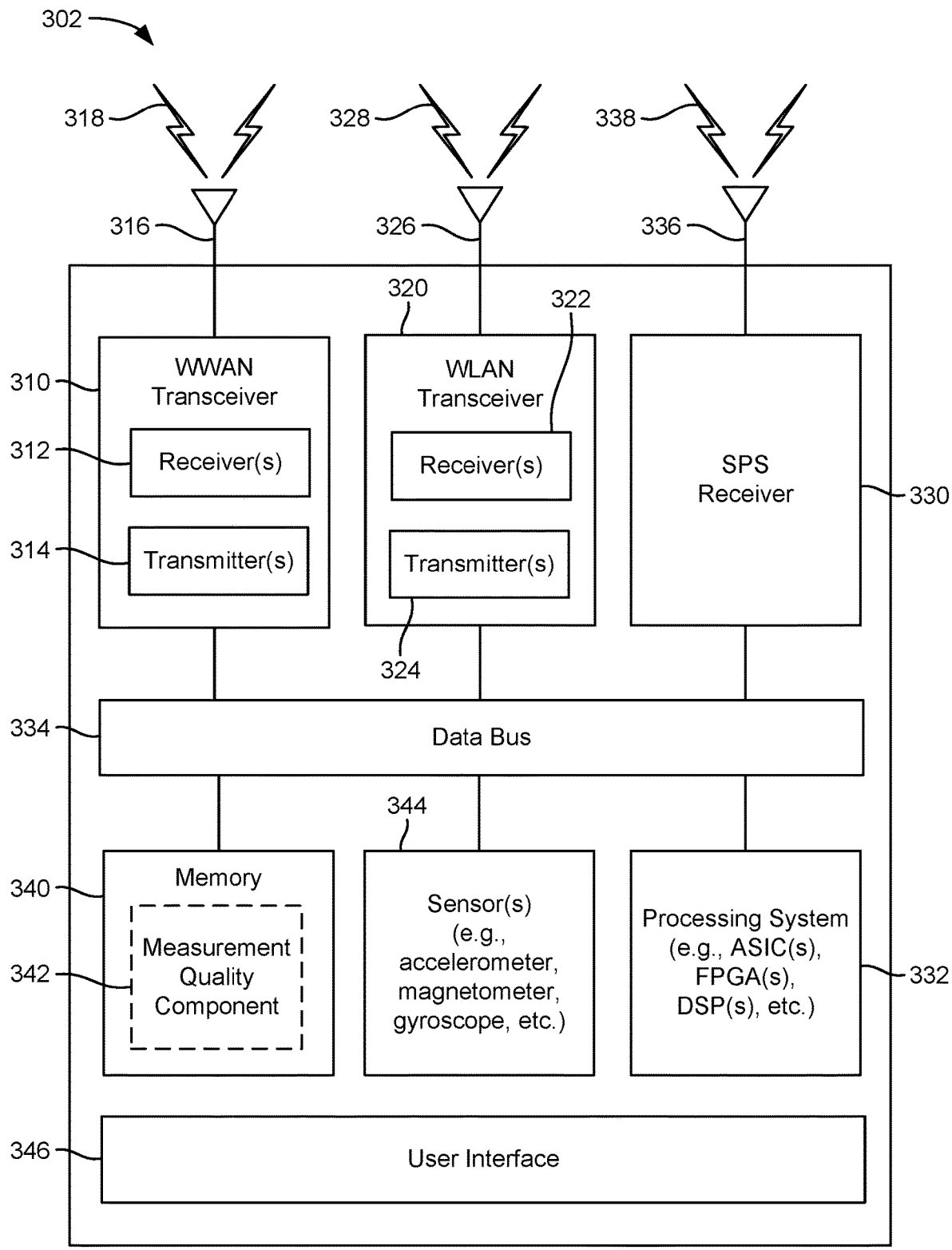
FIGS. 3A to 3C are simplified block diagrams of several sample aspects of components that may be employed in a UE, a base station, and a network entity, respectively.
Figure 3B:
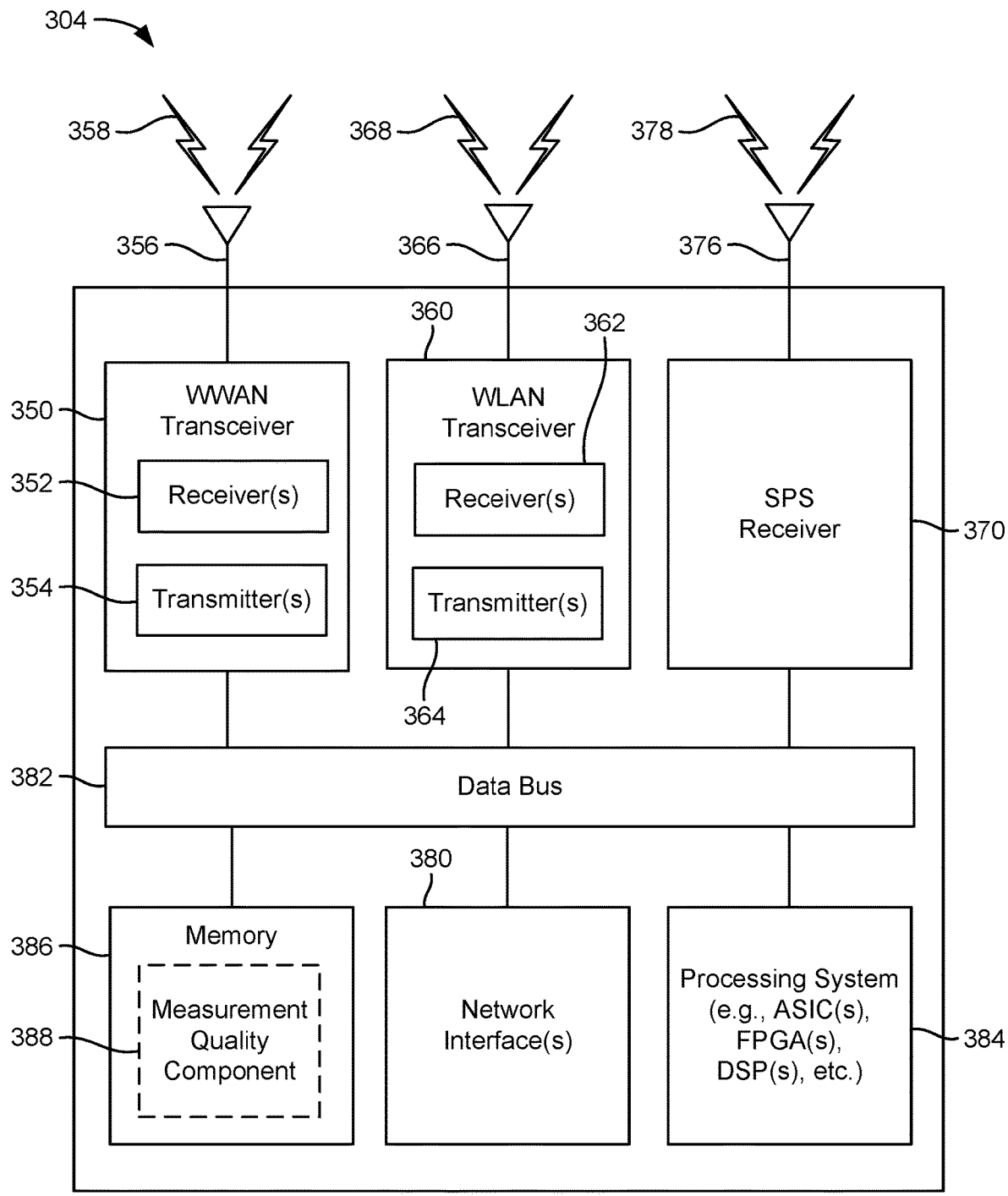
Figure 3C:
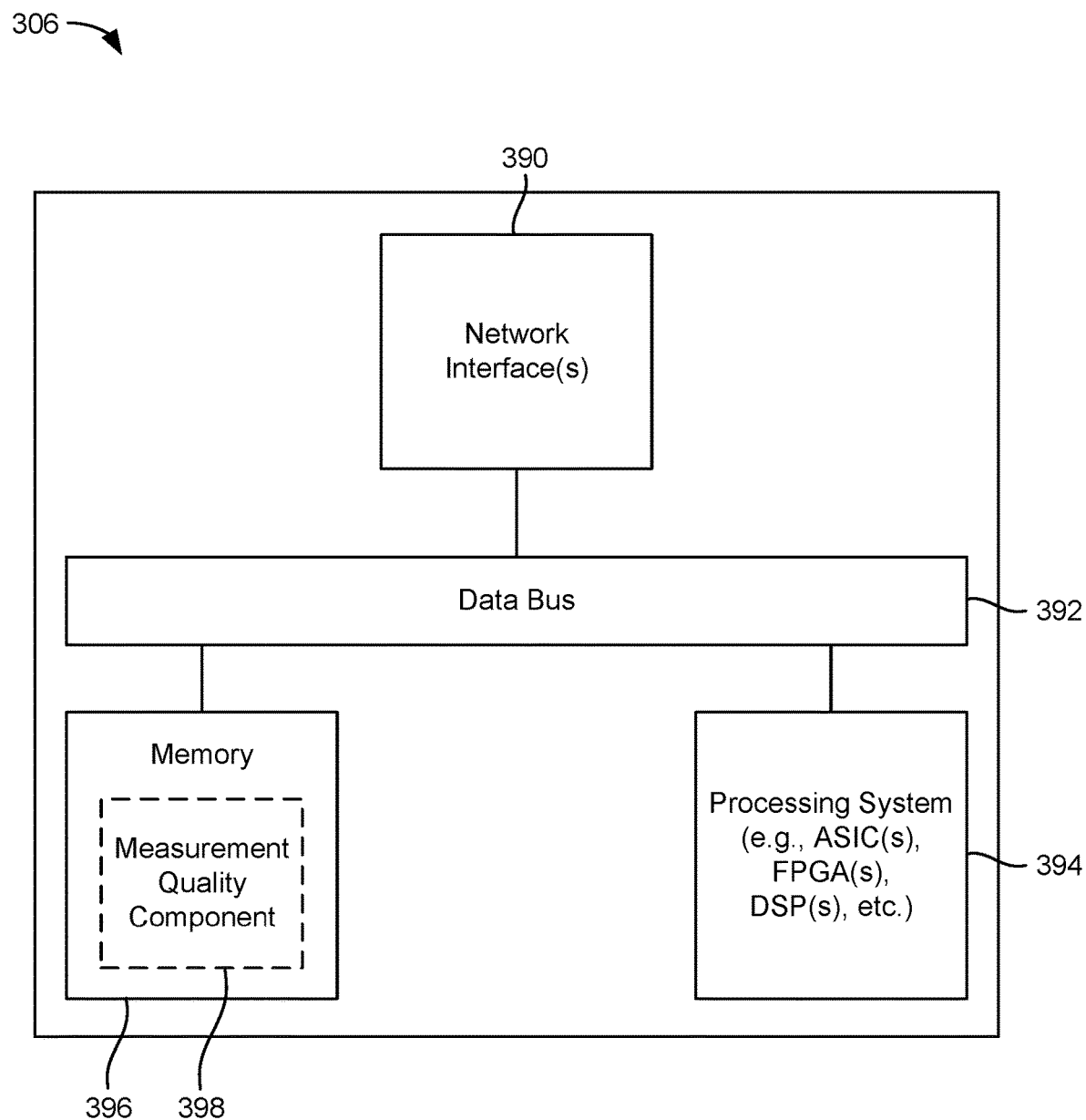

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, measurement quality operations, and for providing other processing functionality. The base station 304 includes a processing system 384 for providing functionality relating to, for example, measurement quality operations as disclosed herein, and for providing other processing functionality. The network entity 306 includes a processing system 394 for providing functionality relating to, for example, measurement quality operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include measurement quality components 342, 388, and 398, respectively. The measurement quality components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the measurement quality components 342, 388, and 398 may be external to the processing systems 332, 384, and 394 (e.g., part of a modem processing system, integrated with another processing system, etc.). Alternatively, the measurement quality components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the measurement quality components 342, 388, and 398, etc.

Figure 4:
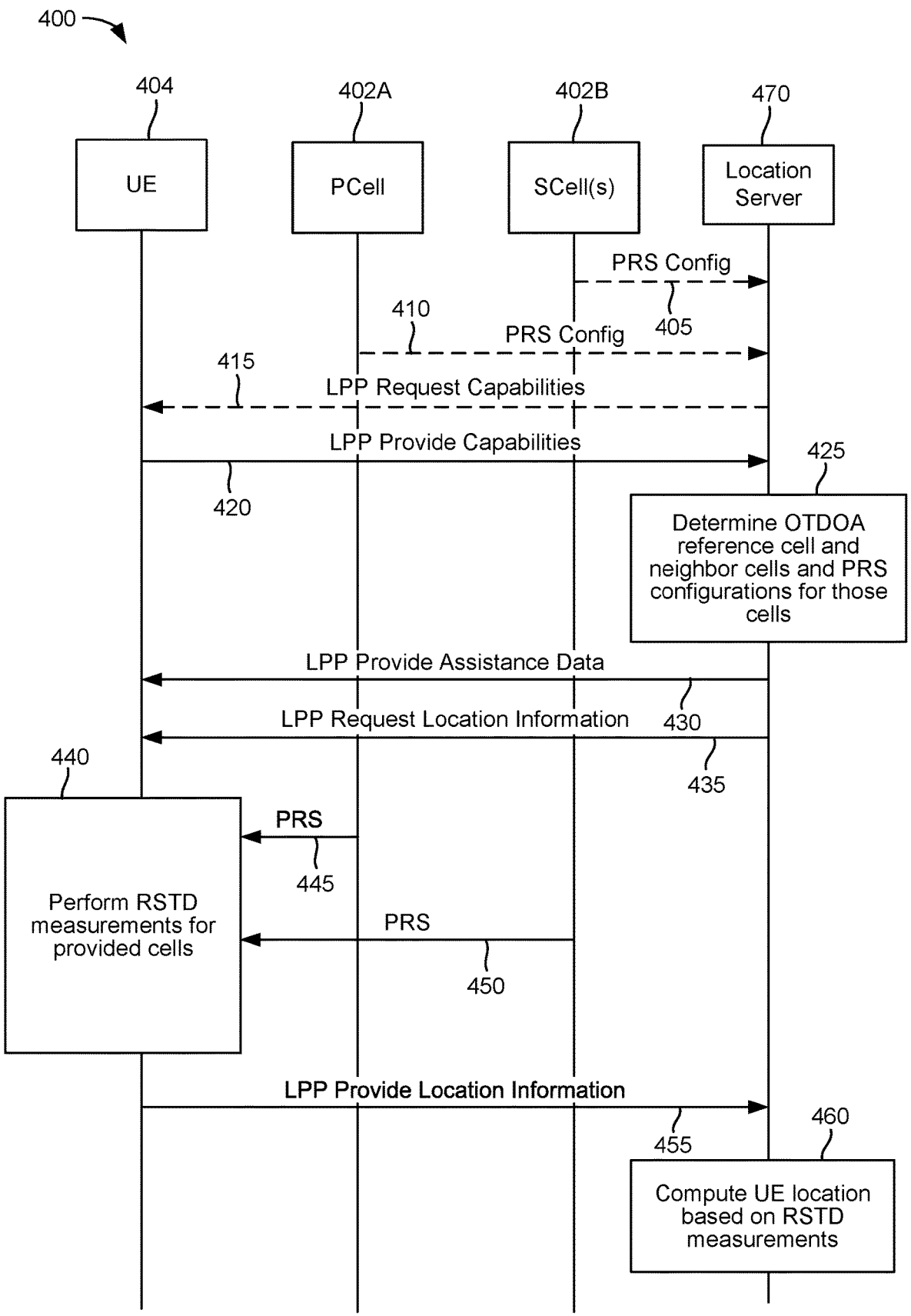
FIG. 4 shows an exemplary method illustrating an observed time difference of arrival (OTDOA) positioning procedure utilizing LTE positioning protocol (LPP), according to aspects of the disclosure.

FIG. 4 shows an exemplary method 400 illustrating an observed time difference of arrival (OTDOA) positioning procedure utilizing LTE positioning protocol (LPP), according to aspects of the disclosure. As illustrated in FIG. 4, positioning of a UE 404 (e.g., any of the UEs described herein) is supported via an exchange of LPP messages between the UE 404 and a location server 470 (e.g., location server 230, LMF 270, SLP 272). The LPP messages may be exchanged between the UE 404 and the location server 470 via one or more intermediate networks, such as New RAN 220 (e.g., via ng-eNB 224, gNB 222) and 5GC 260 (e.g., via AMF 264). The method 400 may be used to position the UE 404 in order to support various location-related services, such as navigation for UE 404 (or for the user of UE 404), or for routing, or for provision of an accurate location to a public safety answering point (PSAP) in association with an emergency call from UE 404 to a PSAP, or for some other reason.

Initially, and as optional operations of signaling flow 400, each involved serving cell (PCells 402A and one or more SCells 402B) in a given geographic area may provide their PRS configuration to the location server 470 at stages 405 and 410. Provision of PRS configuration at stages 405 and 410 may be supported by sending an LTE positioning protocol type A (LPPa) or NR positioning protocol type A (NRPPa) message from each of PCell 402A and SCell(s) 402B to the location server 470. The PRS configuration information provided at stages 405 and 410 may include the periodicity of PRS positioning occasions, the number of consecutive subframes in each PRS positioning occasion, PRS bandwidth, PRS carrier frequency, a PRS code sequence, and other parameters.

At stage 415, the UE 404 may optionally receive a request for its positioning capabilities from the location server 470 (e.g., an LPP Request Capabilities message). At stage 420, the UE 404 provides its positioning capabilities to the location server 470 relative to the LPP protocol by sending an LPP Provide Capabilities message to the location server 470 indicating the positioning methods and features of these positioning methods that are supported by the UE 404 using LPP. The capabilities indicated in the LPP Provide Capabilities message may, in some aspects, indicate that the UE 404 supports OTDOA positioning and may indicate the capabilities of the UE 404 to support OTDOA.

At stage 425, the location server 470 determines an OTDOA reference cell (e.g., PCell 402A, although it may be one of SCells 402B) and neighbor cells (e.g., SCell(s) 402B) and the PRS configuration for those cells, optionally based at least in part on the PRS capability parameters received at stage 420. The location server 470 may further determine the PRS to be measured by the UE 404 for the reference cell and each neighbor cell based on the PRS capability parameters received from the UE and the PRS configurations received from the serving cells. The location server 470 then sends an LPP Provide Assistance Data message to the UE 404 at stage 430. In some implementations, the location server 470 may send the LPP Provide Assistance Data message at stage 430 to the UE 404 in response to an LPP Request Assistance Data message sent by the UE 404 to the location server 470 (not shown in FIG. 4).

The LPP Provide Assistance Data message may include positioning assistance data in the form of OTDOA assistance data to enable or to help enable the UE 404 to obtain and return OTDOA reference signal time difference (RSTD) measurements, and may include information for the reference cell identified at stage 425 (e.g., PCell 402A). The information for the reference cell may include a global identity (ID) for the reference cell, a physical cell ID for the reference cell, a PRS ID, carrier frequency information, and PRS configuration parameters for the PRS configurations determined for the reference cell at stage 425 (e.g., PRS bandwidth, PRS carrier frequency, number of subframes per PRS positioning occasion, PRS code sequence, starting point and periodicity of PRS positioning occasions, and/or muting sequence).

The LPP Provide Assistance Data message may also include OTDOA assistance data for neighbor cells identified at stage 425 (e.g., SCell(s) 402B). The information provided for each neighbor cell in the LPP Provide Assistance Data message may be similar to that provided for the reference cell (e.g., may include a cell ID, PRS ID, carrier frequency, and PRS configuration parameters for the PRS configurations determined at stage 425) and may further include, for example, a slot number and/or subframe offset between the neighbor cell and the reference cell, and/or an expected approximate RSTD value and RSTD uncertainty. The expected RSTD value and the RSTD uncertainty may include the range of expected RSTD values that the UE 404 is expected to measure for each of the serving cells (i.e., PCell 402A and SCell(s) 402B). As described further herein, the LPP Provide Assistance Data message may also include an OTDOA measurement quality field indicating the quality of the OTDOA measurements the UE 404 is expected to report.

At stage 435, the location server 470 sends a request for location information to the UE 404. The request may be an LPP Request Location Information message. Note that in some implementations, the LPP Provide Assistance Data message sent at stage 430 may be sent after the LPP Request Location Information message at 435, for example, if the UE 404 sends a request for assistance data to the location server 470 (e.g., in an LPP Request Assistance Data message, not shown in FIG. 4) after receiving the request for location information at stage 435. The request for location information sent at stage 435 may request the UE 404 to obtain RSTD measurements for OTDO, for example, in association with the information for the reference cell, neighbor cells, and PRS configuration parameters sent to the UE 404 at stage 430.

At stage 440, the UE 404 utilizes the OTDOA positioning assistance information received at stage 430 and any additional data (e.g., a desired measurement quality) received at stage 435 to obtain RSTD measurements for the OTDOA positioning method. The RSTD measurements may be made between PRS transmitted by the reference cell indicated at stage 430, or a reference cell determined by the UE 404 from the neighbor cells indicated at stage 430, and one or more of the (other) neighbor cells indicated at stage 430. The UE 404 utilizes the PRS configuration parameters for the reference and neighbor cells provided at stage 430 to acquire and measure PRS signals for these cells, and according to the PRS configurations supported by UE 404, in order to obtain RSTD measurements. Thus, in the example of FIG. 4, during stage 440, the UE 404 measures PRS from PCell 402A and SCell(s) 402B at stages 445 and 450, respectively.

At stage 455, the UE 404 may send an LPP Provide Location Information message to the location server 470 conveying the RSTD measurements that were obtained at stage 440 before or when any maximum response time has expired (e.g., a maximum response time provided by the location server 470 at stage 435).

At stage 460, the location server 470 computes an estimated location of the UE 404 using OTDOA positioning techniques based, at least in part, on the information received in the LPP Provide Location Information message at stage 455 (e.g., RSTD measurements). In an alternative aspect (not shown in FIG. 4), the location computation at stage 460 may be performed by the UE 404 after stage 440. For example, the positioning assistance data transferred in the message at stage 430 may include base station almanac (BSA) data for the reference cell(s) and neighbor cells (e.g., cell antenna location coordinates and timing or time synchronization information). In that case, the UE 404 may return any computed location estimate to the location server 470 in the message at stage 455 and stage 460 may not be performed.

FIG. 4 shows, and other figures reference, exemplary support for OTDOA positioning with LTE and/or NR radio access by a UE (e.g., UE 404) and, in some cases, using LPP. However, other examples exist where the support of PRS capability parameters and PRS configuration parameters by a UE 404 and a location server 470 may be similar to or the same as that described for these figures but where the positioning protocol, the position method, and/or the RAT may be different. For example, in alternative aspects, the positioning protocol may be the LPP Extensions (LPPe) protocol defined by the Open Mobile Alliance (OMA), a combination of LPP with LPPe (referred to as LPP/LPPe), the RRC protocol, the IS-801 protocol defined in 3GPP2 Technical Specification (TS) C.S0022, or an evolution of LPP for NR or 5G RAT access. Similarly, the position method may be OTDOA for UMTS access, enhanced observed time difference (E-OTD) for GSM, advanced forward link trilateration (AFLT) or OTDOA for NR radio access. In addition, the downlink signal that is measured by a UE (e.g., UE 404) and broadcast by a base station may not be a PRS signal but some other downlink reference signal or pilot signal (e.g., a cell-specific reference signal (CRS) for LTE or a tracking reference signal (TRS) for NR or 5G) and the measurements of the downlink signal may not be of RSTD but instead (or in addition) of some other characteristic such as time of arrival (TOA), angle of arrival (AOA), received signal strength indicator (RSSI), round-trip time (RTT) representing round-trip signal propagation time between the UE and a cell, signal-to-noise (S/N) ratio, etc.

Uplink time difference of arrival (UTDOA) is a similar positioning method to OTDOA, but is based on uplink reference signals (e.g., sounding reference signals (SRS), uplink positioning reference signals (UL PRS)) transmitted by the UE (e.g., UE 404).

The term "position estimate" is used herein to refer to an estimate of a location for a UE, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as, for example, a "position method" or as a "positioning method." A position estimate may include an expected error or uncertainty (e.g., by including an area or volume within which the location is expected to be included with some specified or default level of confidence).

NR supports the reporting of separate metric(s) corresponding to the quality of various positioning measurements, such as RSTD for OTDOA positioning, UE Rx-Tx (i.e., the difference between the reception time of a downlink RTT measurement signal at the UE and the transmission time of an uplink RTT response signal from the UE) for RTT positioning, base station Tx-Rx (i.e., the difference between the transmission time of a downlink RTT measurement signal from the base station and the reception time of an uplink RTT response signal at the base station) for RTT positioning, uplink received time of arrival (UL-RTOA) at the base station for UTDOA positioning, and UL-AoA (including the azimuth of arrival (AoA) and the zenith of arrival (ZoA)) and downlink angle of departure (DL-AoD) for angle-based positioning.

As mentioned above, the LPP Provide Assistance Data message may include an OTDOA measurement quality field ("OTDOA-MeasQuality" in LPP) indicating how the UE 404 is to report the error, or uncertainty, of the OTDOA measurements the UE 404 is performing. The OTDOA measurement quality field may include an error resolution value ("error-Resolution" in LPP), an error value ("error-Value" in LPP), and a number of samples ("error-NumSamples" in LPP). The error resolution value specifies the resolution used in the error value field. The resolution value may be encoded on two bits and represent the values 5, 10, 20, or 30 meters. The error value specifies the UE's best estimate of the error or uncertainty in the positioning measurement (e.g., RSTD measurement, ToA measurement, etc.). It may be encoded on five bits, representing the values of 1 to 31. In that way, the amount of uncertainty around a measurement can be represented as falling into a range defined by the resolution (R=5, 10, 20, or 30) and the error value (E=1, 2, 3, . . . , 31), specifically, R*(E-1) to R*E-1 meters.

For example, for an error resolution value of R=20 and an error value of E=2, the uncertainty around the associated positioning measurement would be between 20 and 39 meters (i.e., 20*1 to 20*2-1). That means, for some measurement M, the amount of error or uncertainty around the measurement M would be reported as being between 20 and 39 meters. Said another way, the measurement is M±20 to 39 meters. Note that the UE is to report the measurement with the specified uncertainty range regardless of how certain the UE is of the accuracy of the measurement. For example, the UE may be capable of taking a measurement with an uncertainty of 10 meters, but because the location server has specified an uncertainty range of 20 to 39 meters, the UE reports the measurement with that uncertainty.

Table 1 below represents the ranges of uncertainty values that can be represented by the error resolution value and the error value:

TABLE 1

| Error Resolution | Error Value | | | |
|---|---|---|---|---|
| | 5 | 10 | 20 | 30 |
| 1 | 4 | 9 | 19 | 29 |
| 2 | 9 | 19 | 39 | 59 |
| 3 | 14 | 29 | 59 | 89 |
| 4 | 19 | 39 | 79 | 119 |
| 5 | 24 | 49 | 99 | 149 |
| 6 | 29 | 59 | 119 | 179 |

TABLE 1-continued

| Error Resolution | Error Value | | | |
|---|---|---|---|---|
| | 5 | 10 | 20 | 30 |
| 7 | 34 | 69 | 139 | 209 |
| 8 | 39 | 79 | 159 | 239 |
| 9 | 44 | 89 | 179 | 269 |
| 10 | 49 | 99 | 199 | 299 |
| 11 | 54 | 109 | 219 | 329 |
| 12 | 59 | 119 | 239 | 359 |
| 13 | 64 | 129 | 259 | 389 |
| 14 | 69 | 139 | 279 | 419 |
| 15 | 74 | 149 | 299 | 449 |
| 16 | 79 | 159 | 319 | 479 |
| 17 | 84 | 169 | 339 | 509 |
| 18 | 89 | 179 | 359 | 539 |
| 19 | 94 | 189 | 379 | 569 |
| 20 | 99 | 199 | 399 | 599 |
| 21 | 104 | 209 | 419 | 629 |
| 22 | 109 | 219 | 439 | 659 |
| 23 | 114 | 229 | 459 | 689 |
| 24 | 119 | 239 | 479 | 719 |
| 25 | 124 | 249 | 499 | 749 |
| 26 | 129 | 259 | 519 | 779 |
| 27 | 134 | 269 | 539 | 809 |
| 28 | 139 | 279 | 559 | 839 |
| 29 | 144 | 289 | 579 | 869 |
| 30 | 149 | 299 | 599 | 899 |
| 31 | 154 | 309 | 619 | 929 |

Regarding the number of samples field, if the error value field provides the uncertainty of the positioning measurement, the number of samples field specifies how many measurements have been used by the UE to determine the error value (i.e., the sample size). It may be encoded in three bits, and represent ranges of values such as 5-9, 10-14, 15-24, and so on up to a range of 55 samples or more.

When providing location information to the location server (e.g., as at stage 455 of FIG. 4), the UE reports an OTDOA reference quality field and RSTD quality field to the location server. These fields include the measurement quality values of the reported positioning measurements as derived based on the parameters in the OTDOA measurement quality field ("OTDOA-MeasQuality" in LPP) received from the location server. The OTDOA reference quality field indicates the UE's best estimate of the quality of the ToA measurement of the downlink reference signal (e.g., PRS) from the RSTD reference cell (e.g., PCell 402A). The RSTD quality field specifies the UE's best estimate of the quality of the measured RSTD between the reference cell and a neighboring cell. The UE may report the OTDOA reference quality and RSTD quality fields for each RSTD measurement.

As can be seen in Table 1, the minimum error value that can be provided is 5 meters. A 10-bit field is dedicated to reporting the error, which is split into the three sub-fields described above (i.e., error-Resolution=2 bits, error-Value=5 bits, error-NumSamples=3 bits). It would be beneficial to have a smaller minimum value of error, especially for commercial use-cases. It is noteworthy that seven bits are used to report the error resolution and error value, even though some values are repeated (e.g., 9, 19, 29, etc.) or are irrelevant (e.g., large error values where there is no relevant difference between the error values, such as 869 and 899).

Accordingly, the present disclosure describes a configurable scaling function to be used for reporting the measurement error of positioning measurements (e.g., timing measurements, such as RSTD, ToA, etc., and angle measurements, such as AoA, ZoA, etc.). A UE or base station can be configured with the following parameters: (1)

minimum error, (2) maximum error, (3) number of bits to report the measurement quality value, and (4) the scaling function to use (e.g., linear or logarithmic). In an aspect, the minimum error may be, for example, from 10 centimeters up to 5 meters, the maximum error may be, for example, from 3 meters up to 900 meters, the number of bits may be, for example, from three bits up to 10 bits, and the particular scaling function may be indicated by one or two bits. These parameters may be included in a measurement quality field (similar to the "OTDOA-MeasQuality" field in LPP) that contains sub-fields for each of these parameters.

The location server (e.g., location server 230, LMF 270, SLP 272) may provide the foregoing parameters to a UE (for UE measurements, such as UE Rx-Tx, ToA, etc.) in the assistance data (e.g., at 430 of FIG. 4), or to a base station (for base station measurements, such as base station Tx-Rx, UL-RTOA, etc.) using LPPa or NRPPa. The UE/base station (both being examples of a "network node") then reports, for the positioning measurements being reported, one or more measurement quality values derived based on these parameters. More specifically, as discussed further below, the UE/base station may calculate a measurement quality value for each (or some group) of the reported positioning measurements based on the minimum error, the maximum error, the number of bits to report the measurement quality value, and the scaling function.

In an aspect, the location server may indicate that the UE/base station is to separately report a measurement quality value for each positioning measurement (i.e., a different set of parameters for each base station), for all measurements of each type of positioning measurement (e.g., one set of parameters for all RSTD measurements, another set of parameters for all UE Rx-Tx measurements, etc.), for all positioning measurements (i.e., one set of parameters applicable to all measurements), or for each frequency layer (e.g., one set of parameters for FR1 and another set of parameters for FR2, or per band, or per band combination). Note that a collection of a particular type of measurement (e.g., RSTD) is referred to as a measurement set.

For example, the location server may configure a UE with a minimum error of 10 centimeters and a maximum error of 10 meters for FR2, and a minimum error of 10 meters and a maximum error of 600 meters for FR1. The number of bits would then depend on these values and the scaling function. The scaling function may be the same for both FR1 and FR2, or could be different.

In an aspect, rather than providing all of the parameters to the UE or base station (i.e., minimum error, maximum error, number of bits, and scaling function), the location server may configure a subset of the parameters, such as the scaling function, and the UE or base station may report the remaining parameters via LPP (e.g., at stage 455 of FIG. 4) or LPPa/NRPPa, respectively. This may be beneficial to prevent the location server from requesting an unattainable minimum error (e.g., 10-centimeter accuracy where the UE is only capable of five-meter accuracy), or specifying an unnecessarily large maximum error (e.g., 500-meter accuracy where the UE is capable of 10-meter accuracy).

In an aspect, the UE (or base station) may report one or multiple percentile(s) associated with an error to indicate how confident the UE (or base station) is in the estimated error. For example, the percentiles may be 50%, 67% 80%, or 95%. For example, a UE may report an error of four meters with an 80% confidence. Alternatively, the location server may configure the UE or base station with the percentile(s) it is interested in the UE or base station reporting. For example, the location server may specify that only measurements with error values with an associated confidence in the 80% percentile are to be reported.

In an aspect, if the error of a measurement is greater than the maximum error parameter, the UE or base station can report a value of "not applicable" or "outside the region" for that measurement/error. For example, if a UE does not report the parameters for a given measurement, or the measurement itself, it may indicate that the error for that measurement is greater than the maximum error.

Figure 5:
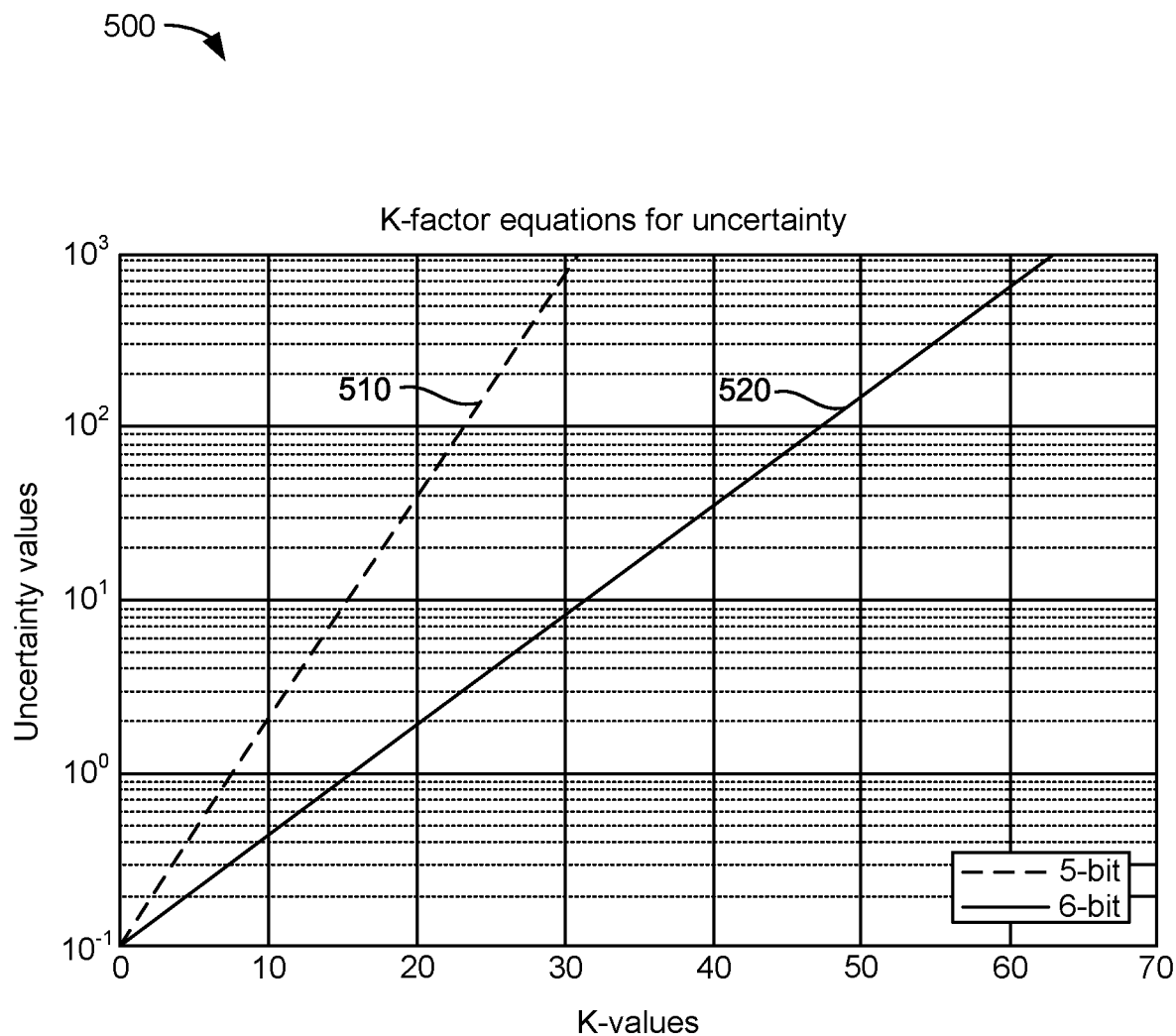
FIG. 5 illustrates a graph showing the uncertainty values that can be reported for given K values, according to aspects of the disclosure.

In an aspect, the scaling function may be a K-factor function such as $Y = C \times (1+x)^K$, where Y is the uncertainty value, K is an integer scaling factor from 0 to $K_{max}$, C is the minimum error value (i.e., MIN_VAL) the UE is able to report (e.g., 0.01 meters), x is $10^{\log 10(MAX\_VAL) - \log 10(MIN\_VAL)/Kmax} - 1$, and $K_{max}$ is $2^{numbits} - 1$. MAX_VAL (the maximum error value) and MIN_VAL (the minimum error value) are configured by the location server. As illustrated in FIG. 5, this function is linear on a logarithmic scale, that is, logarithmic.

Thus, to report the measurement quality value of a positioning measurement, the UE (or base station) determines the scaling function, then uses the minimum error value (MIN_VAL), maximum error value (MAX_VAL), and number of bits (numbits) parameters for that type of positioning measurement in the scaling function to calculate the measurement quality value (Y). The UE (or base station) may determine the scaling function by retrieving the scaling function from memory based on an identifier of the scaling function received in the positioning assistance data, or by receiving the scaling function itself in the assistance data. The other parameters may have also been received in assistance data, or may be determined by the UE (or base station) and reported to the location server. The UE (or base station) may then report the measurement quality value in an OTDOA reference quality field and/or RSTD quality field.

FIG. 5 illustrates a graph 500 showing the measurement quality (or uncertainty) values that can be reported for given K values, according to aspects of the disclosure. In FIG. 5, plot 510 represents the uncertainty values Y where numbits is five bits, meaning Kmax is 31 and K takes the values of 0 to 31. Plot 520 represents the uncertainty values Y where numbits is six bits, meaning $K_{max}$ is 63 and K takes the values of 0 to 63. The UE (or base station) reports the value of K, and the location server uses the reported value of K in the K-factor function to determine the associated error. Thus, instead of reporting a value from Table 1 as the error, the UE (or base station) reports the value of K. As can be seen in FIG. 5, the points on plot 510 are further apart than the points on plot 520, meaning that a six-bit value of K provides finer granularity, or greater precision, for reporting error values.

Note that for angle-based measurements, instead of the error being in meters (or some other measure of distance), the error would be in degrees (or some other measure of angle). That is, the minimum error and maximum error would be in degrees rather than meters. Further, in addition to the different types of parameter reporting (e.g., different parameters for FR1 versus FR2), there may be different parameters for elevation measurements than for azimuth measurements, as elevation measurements are harder than azimuth measurements to perform accurately. Everything else would be the same.

Figure 6:
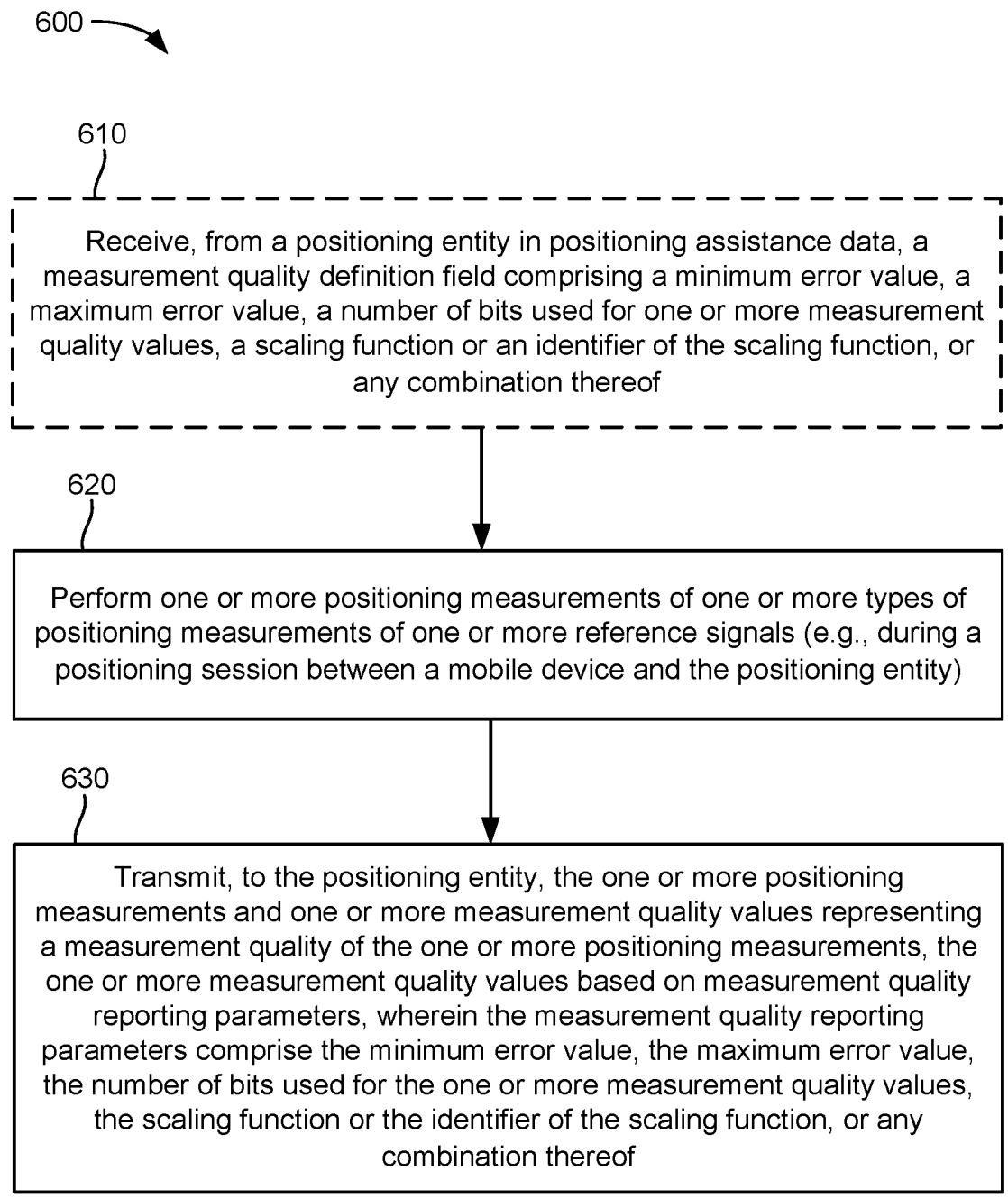
FIGS. 6 and 7 illustrate exemplary methods of wireless communication, according to aspects of the disclosure.

FIG. 6 illustrates an exemplary method 600 of wireless communication, according to various aspects of the disclosure. The method 600 may be performed by a network node (e.g., any of the UEs or base stations described herein).

At 610, the network node optionally receives, from a positioning entity (e.g., location server 230, LMF 270, SLP 272) in positioning assistance data, a measurement quality definition field comprising a minimum error value, a maximum error value, a number of bits used for the one or more measurement quality values, a scaling function or an identifier of the scaling function, or any combination thereof. In an aspect, where the network node is a UE, operation 610 may be performed by WWAN transceiver(s) 310, processing system 332, memory component 340, and/or measurement quality component 342, any or all of which may be considered means for performing this operation. Where the network node is a base station, operation 610 may be performed by network interface(s) 380, processing system 384, memory component 386, and/or measurement quality component 388, any or all of which may be considered means for performing this operation.

At 620, the network node performs one or more positioning measurements of one or more types of positioning measurements of one or more reference signals (e.g., PRS). In an aspect, the network node may perform the one or more positioning measurements during a positioning session between a mobile device (e.g., any of the UEs described herein) and the positioning entity. In an aspect, where the network node is a UE, operation 620 may be performed by WWAN transceiver(s) 310, processing system 332, memory component 340, and/or measurement quality component 342, any or all of which may be considered means for performing this operation. Where the network node is a base station, operation 620 may be performed by WWAN transceiver(s) 350, processing system 384, memory component 386, and/or measurement quality component 388, any or all of which may be considered means for performing this operation.

At 630, the network node transmits, to the positioning entity, the one or more positioning measurements and one or more measurement quality values representing a measurement quality of the one or more positioning measurements, the one or more measurement quality values based on measurement quality reporting parameters, wherein the measurement quality reporting parameters comprise the minimum error value, the maximum error value, the number of bits used for the one or more measurement quality values, the scaling function or the identifier of the scaling function, or any combination thereof. In an aspect, where the network node is a UE, operation 630 may be performed by WWAN transceiver(s) 310, processing system 332, memory component 340, and/or measurement quality component 342, any or all of which may be considered means for performing this operation. Where the network node is a base station, operation 630 may be performed by network interface(s) 380, processing system 384, memory component 386, and/or measurement quality component 388, any or all of which may be considered means for performing this operation.

Figure 7:
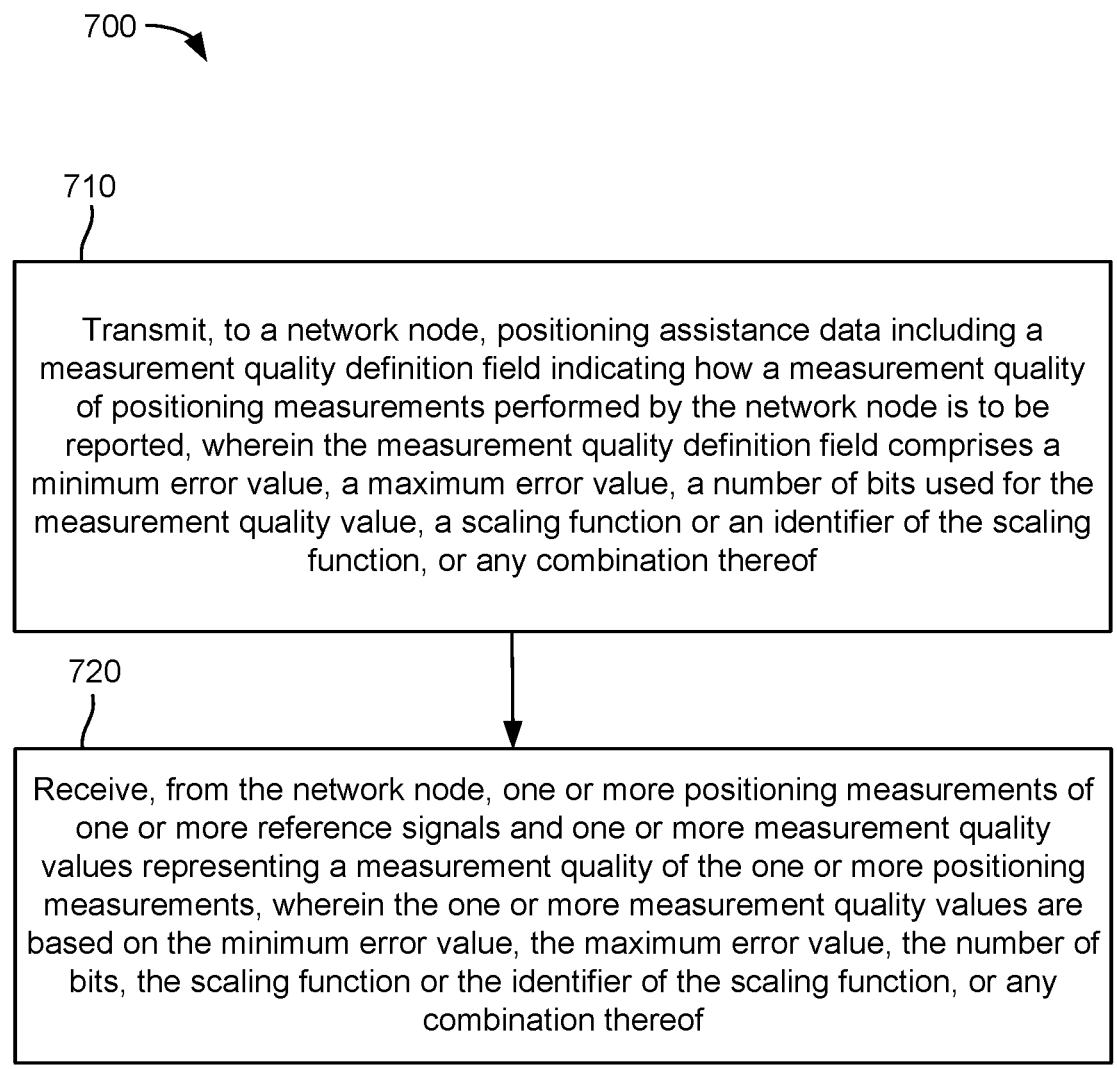

FIG. 7 illustrates an exemplary method 700 of wireless communication, according to various aspects of the disclosure. The method 700 may be performed by a positioning entity (e.g., location server 230, LMF 270, SLP 272).

At 710, the positioning entity transmits, to a network node (e.g., any of the UEs or base stations described herein), positioning assistance data including a measurement quality definition field indicating how a measurement quality of positioning measurements performed by the network node is to be reported, wherein the measurement quality definition field comprises a minimum error value, a maximum error value, a number of bits used for the measurement quality value, a scaling function or an identifier of the scaling function, or any combination thereof. In an aspect, the positioning assistance data may be transmitted during a positioning session between a mobile device (e.g., any of the UEs described herein) and the positioning entity. In an aspect, operation 710 may be performed by network interface(s) 390, processing system 394, memory component 396, and/or measurement quality component 398, any or all of which may be considered means for performing this operation.

At 720, the positioning entity receives, from the network node, one or more positioning measurements of one or more reference signals and one or more measurement quality values representing a measurement quality of the one or more positioning measurements, wherein the one or more measurement quality values are based on the minimum error value, the maximum error value, the number of bits, the scaling function or the identifier of the scaling function, or any combination thereof. In an aspect, operation 720 may be performed by network interface(s) 390, processing system 394, memory component 396, and/or measurement quality component 398, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A network node, comprising:
   a memory;
   at least one transceiver; and
   at least one processor communicatively coupled to the memory and the at least one transceiver, the at least one processor configured to:
      perform one or more positioning measurements of one or more types of positioning measurements of one or more reference signals; and
      cause the at least one transceiver to transmit, to a positioning entity, the one or more positioning measurements and one or more measurement quality values representing a measurement quality of the one or more positioning measurements, the one or more measurement quality values based on measurement quality reporting parameters, wherein the measurement quality reporting parameters comprise a minimum error value for the one or more positioning measurements, a maximum error value for the one or more positioning measurements, a number of bits used to report the one or more measurement quality values, and a scaling function or an identifier of the scaling function, and wherein the scaling function is used to calculate the one or more measurement quality values based on the minimum error value, the maximum error value, and the number of bits.

2. The network node of claim 1, wherein the at least one processor is further configured to:
   receive, from the positioning entity via the at least one transceiver, a measurement quality definition field in positioning assistance data comprising the minimum error value, the maximum error value, the number of bits used for the one or more measurement quality values, the scaling function or the identifier of the scaling function, or any combination thereof.

3. The network node of claim 2, wherein the positioning assistance data indicates that the measurement quality reporting parameters are configured separately for each of the one or more positioning measurements, for all of the one or more positioning measurements of each of the one or more types of positioning measurement, for all of the one or more positioning measurements, for all of the one or more positioning measurements in each frequency layer, for all of the one or more positioning measurements in a band, for all of the one or more positioning measurements in a band of a band combination, for all elevation-based angle measurements, or for all azimuth-based angle measurements.

4. The network node of claim 3, wherein the one or more types of positioning measurements comprise a time of arrival (ToA) measurement, a reference signal time difference (RSTD) measurement, a difference between a reception time of the one or more reference signals and a transmission time of a second reference signal, a difference between the transmission time of the second reference signal and the reception time of the one or more reference signals, an uplink received time of arrival (UL-RTOA) measurement, an angle of arrival (AoA) measurement, or any combination thereof.

5. The network node of claim 2, wherein:
   the measurement quality definition field includes a subset of the minimum error value, the maximum error value, the number of bits used for the one or more measurement quality values, and the scaling function or the identifier of the scaling function, and
   the at least one processor is further configured to cause the at least one transceiver to transmit remaining parameters of the minimum error value, the maximum error value, the number of bits used for the one or more measurement quality values, and the scaling function or the identifier of the scaling function.

6. The network node of claim 2, wherein:
   the measurement quality definition field includes the scaling function or the identifier of the scaling function and not the minimum error value, the maximum error value, and the number of bits used for the one or more measurement quality values, and
   the at least one processor is further configured to cause the at least one transceiver to transmit the minimum error value, the maximum error value, and the number of bits used for the one or more measurement quality values, and not the scaling function or the identifier of the scaling function.

7. The network node of claim 1, wherein the scaling function comprises a logarithmic function.

8. The network node of claim 1, wherein the scaling function depends on a scaling factor K.

9. The network node of claim 8, wherein the scaling function is $Y=C\times(1+x)^K$, wherein Y is the measurement quality, the scaling factor K is an integer from 0 to $K_{max}$, C is the minimum error value, x is $10^{log10(MAX\_VAL)-log10(MIN\_VAL)/Kmax}-1$, and $K_{max}$ is $2^{numbits}-1$, and wherein numbits is the number of bits, MAX_VAL is the maximum error value, and MIN_VAL is the minimum error value.

10. The network node of claim 1, wherein the at least one processor is further configured to:
cause the at least one transceiver to transmit one or more confidence values representing a confidence of the network node in the one or more measurement quality values.

11. The network node of claim 10, wherein the at least one processor is further configured to:
cause the at least one transceiver to transmit the one or more positioning measurements based on the one or more confidence values being higher than a threshold confidence value.

12. The network node of claim 11, wherein the at least one processor is further configured to:
receive, via the at least one transceiver, the threshold confidence value from the positioning entity.

13. The network node of claim 1, wherein the at least one processor is further configured to:
cause the at least one transceiver to transmit, based on an uncertainty of at least one positioning measurement of the one or more positioning measurements being greater than the maximum error value, an indication that the uncertainty of the at least one positioning measurement is greater than the maximum error value.

14. The network node of claim 13, wherein the indication comprises an empty value for a measurement quality value of the one or more measurement quality values corresponding to the at least one positioning measurement.

15. The network node of claim 1, wherein the one or more positioning measurements comprise one or more timing measurements of the one or more reference signals, one or more angle measurements of the one or more reference signals, or any combination thereof.

16. The network node of claim 15, wherein:
the one or more timing measurements comprise one or more time of arrival (ToA) measurements or one or more reference signal time difference (RSTD) measurements of the one or more reference signals, and
the one or more angle measurements comprise one or more azimuth angle of arrival (AoA) measurements of the one or more reference signals or one or more zenith angle of arrival (ZoA) measurements of the one or more reference signals.

17. A positioning entity, comprising:
a memory;
at least one network interface; and
at least one processor communicatively coupled to the memory and the at least one network interface, the at least one processor configured to:
cause the at least one network interface to transmit, to a network node, during a positioning session between a mobile device and the positioning entity, positioning assistance data including a measurement quality definition field indicating how a measurement quality of positioning measurements performed by the network node is to be reported, wherein the measurement quality definition field comprises a minimum error value for the one or more positioning measurements, a maximum error value for the one or more positioning measurements, a number of bits used to report the measurement quality value, a scaling function or an identifier of the scaling function, or any combination thereof; and
receive, from the network node via the at least one network interface, one or more positioning measurements of one or more reference signals and one or more measurement quality values representing a measurement quality of the one or more positioning measurements, wherein the scaling function is used to calculate the one or more measurement quality values based on the minimum error value, the maximum error value, and the number of bits.

18. The positioning entity of claim 17, wherein the positioning assistance data indicates that the measurement quality is to be reported separately for each positioning measurement, for all positioning measurements of each type of positioning measurement, for all positioning measurements, for all positioning measurements in each frequency layer, for all positioning measurements in a band, for all positioning measurements in a band of a band combination, for all elevation-based angle measurements, or for all azimuth-based angle measurements.

19. The positioning entity of claim 17, wherein:
the measurement quality definition field includes the scaling function or the identifier of the scaling function and not the minimum error value, the maximum error value, and the number of bits, and
the one or more measurement quality values include the minimum error value, the maximum error value, and the number of bits, and not the scaling function or the identifier of the scaling function.

20. The positioning entity of claim 17, wherein the scaling function comprises a logarithmic function.

21. The positioning entity of claim 17, wherein the scaling function depends on a scaling factor K.

22. The positioning entity of claim 17, wherein the at least one processor is further configured to:
receive, via the at least one network interface, one or more confidence values representing a confidence of the network node in the one or more measurement quality values.

23. The positioning entity of claim 22, wherein the positioning entity receives the one or more positioning measurements based on the one or more confidence values being higher than a threshold confidence value.

24. The positioning entity of claim 23, wherein the at least one processor is further configured to:
cause the at least one network interface to transmit the threshold confidence value to the network node.

25. The positioning entity of claim 17, wherein the at least one processor is further configured to:
receive, from the network node via the at least one network interface, based on an uncertainty of at least one positioning measurement of the one or more positioning measurements being greater than the maximum error value, an indication that the uncertainty of the at least one positioning measurement is greater than the maximum error value.

26. The positioning entity of claim 25, wherein the indication comprises an empty value for a measurement quality value of the one or more measurement quality values corresponding to the at least one positioning measurement.

27. The positioning entity of claim 17, wherein the one or more positioning measurements comprise one or more timing measurements of the one or more reference signals, one or more angle measurements of the reference signal, or any combination thereof.

28. The positioning entity of claim 27, wherein:
the one or more timing measurements comprise one or more time of arrival (ToA) measurements or one or more reference signal time difference (RSTD) measurements of the one or more reference signals, and
the one or more angle measurements comprise one or more azimuth angle of arrival (AoA) measurements of the one or more reference signals or one or more zenith angle of arrival (ZoA) measurements of the one or more reference signals.

29. A method of wireless communication performed by a network node, comprising:
performing one or more positioning measurements of one or more types of positioning measurements of one or more reference signals; and
transmitting, to a positioning entity, the one or more positioning measurements and one or more measurement quality values representing a measurement quality of the one or more positioning measurements, the one or more measurement quality values based on measurement quality reporting parameters, wherein the measurement quality reporting parameters comprise a minimum error value for the one or more positioning measurements, a maximum error value for the one or more positioning measurements, a number of bits used to report the one or more measurement quality values, and a scaling function or an identifier of the scaling function, and wherein the scaling function is used to calculate the one or more measurement quality values based on the minimum error value, the maximum error value, and the number of bits.

30. A method of wireless communication performed by a positioning entity, comprising:
transmitting, to a network node, during a positioning session between a mobile device and the positioning entity, positioning assistance data including a measurement quality definition field indicating how a measurement quality of positioning measurements performed by the network node is to be reported, wherein the measurement quality definition field comprises a minimum error value for the one or more positioning measurements, a maximum error value for the one or more positioning measurements, a number of bits used to report the measurement quality value, a scaling function or an identifier of the scaling function, or any combination thereof; and
receiving, from the network node, one or more positioning measurements of one or more reference signals and one or more measurement quality values representing a measurement quality of the one or more positioning measurements, wherein the scaling function is used to calculate the one or more measurement quality values based on the minimum error value, the maximum error value, and the number of bits.

* * * * *